United States Patent
Whittenberger et al.

[11] Patent Number: 5,846,495
[45] Date of Patent: *Dec. 8, 1998

[54] STRUCTURE FOR CONVERTER BODY

[75] Inventors: William A. Whittenberger, Leavittsburg; David Thomas Sheller, Garrettsville, both of Ohio

[73] Assignee: Engelhard Corporation, Iselin, N.J.

[*] Notice: The term of this patent shall not extend beyond the expiration date of Pat. No. 5,651,906.

[21] Appl. No.: 883,264

[22] Filed: Jun. 26, 1997

Related U.S. Application Data

[63] Continuation of Ser. No. 501,755, Jul. 12, 1995, abandoned.

[51] Int. Cl.⁶ .............................. B01D 53/34; F01N 3/10
[52] U.S. Cl. ...................... 422/180; 422/174; 422/177; 422/199; 422/211; 422/222; 502/527.18; 60/300; 55/DIG. 30; 428/116; 428/593; 428/594
[58] Field of Search .................................... 422/171, 177, 422/174, 180, 199, 211, 222; 60/299; 55/DIG. 30; 502/439, 527.18; 428/116, 593–594

[56] References Cited

U.S. PATENT DOCUMENTS

| | | | |
|---|---|---|---|
| 3,770,389 | 11/1973 | Kitzner et al. | 422/174 |
| 3,857,680 | 12/1974 | Porta et al. | 428/200 |
| 3,890,104 | 6/1975 | Porta et al. | 422/197 |
| 3,992,330 | 11/1976 | Noakes et al. | 502/336 |
| 4,381,590 | 5/1983 | Nonnemann et al. | 29/890 |
| 4,795,616 | 1/1989 | Mondt et al. | 422/179 |
| 4,803,189 | 2/1989 | Swars | 502/439 |
| 4,832,998 | 5/1989 | Cyron | 428/116 |
| 4,842,954 | 6/1989 | Cyron et al. | 428/593 |
| 4,857,413 | 8/1989 | Hashimoto et al. | 428/592 |
| 4,923,109 | 5/1990 | Cyron | 228/181 |
| 4,946,822 | 8/1990 | Swars | 502/439 |
| 5,070,694 | 12/1991 | Whittenberger | 422/174 |
| 5,102,743 | 4/1992 | Maus et al. | 428/593 |
| 5,105,539 | 4/1992 | Maus et al. | 29/890 |
| 5,130,100 | 7/1992 | Serizawa | 422/180 |
| 5,135,794 | 8/1992 | Maus et al. | 428/116 |
| 5,139,844 | 8/1992 | Maus et al. | 428/116 |
| 5,163,291 | 11/1992 | Hitachi | 60/299 |
| 5,310,586 | 5/1994 | Mullen | 428/54.1 |
| 5,342,588 | 8/1994 | Humpolik | 422/311 |
| 5,366,700 | 11/1994 | Humpolik et al. | 422/180 |
| 5,372,893 | 12/1994 | Usui | 428/593 |
| 5,374,402 | 12/1994 | Hitachi et al. | 422/177 |
| 5,446,006 | 8/1995 | Domesle et al. | 502/439 |
| 5,651,906 | 7/1997 | Whittenberger et al. | 422/174 |

FOREIGN PATENT DOCUMENTS

| | | |
|---|---|---|
| 0245736 | 5/1987 | European Pat. Off. |
| 0322566 | 11/1988 | European Pat. Off. |
| 4215986 | 5/1992 | Germany |
| 3838295 | 5/1994 | Germany |

*Primary Examiner*—Hien Tran

[57] ABSTRACT

There is provided an improved converter body formed of thin metal core elements and a housing. The thin metal core elements have a distal end and a proximal end The distal ends are secured to the housing, and at least some, preferably all, of the proximal ends are free of attachment to any rigid member. This structure results in improved durability in severe automotive tests.

8 Claims, 3 Drawing Sheets

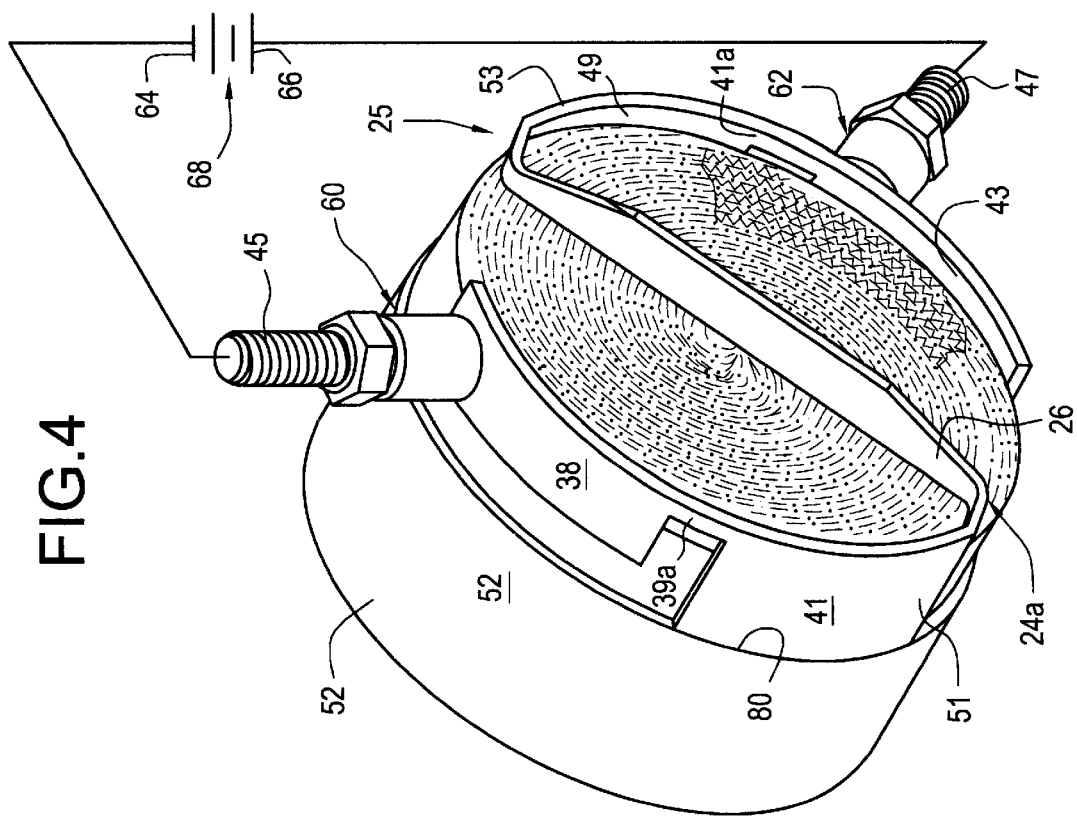
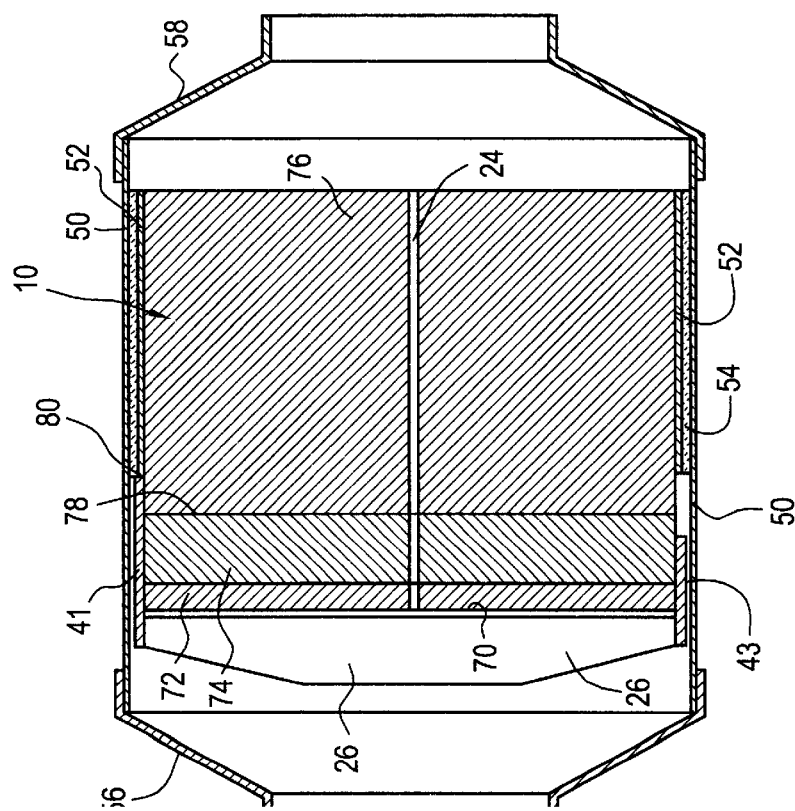

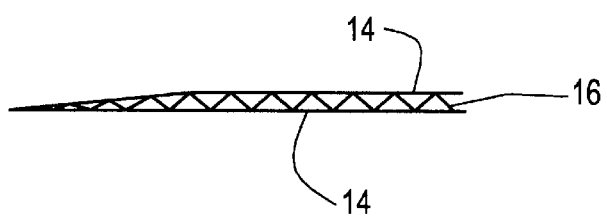
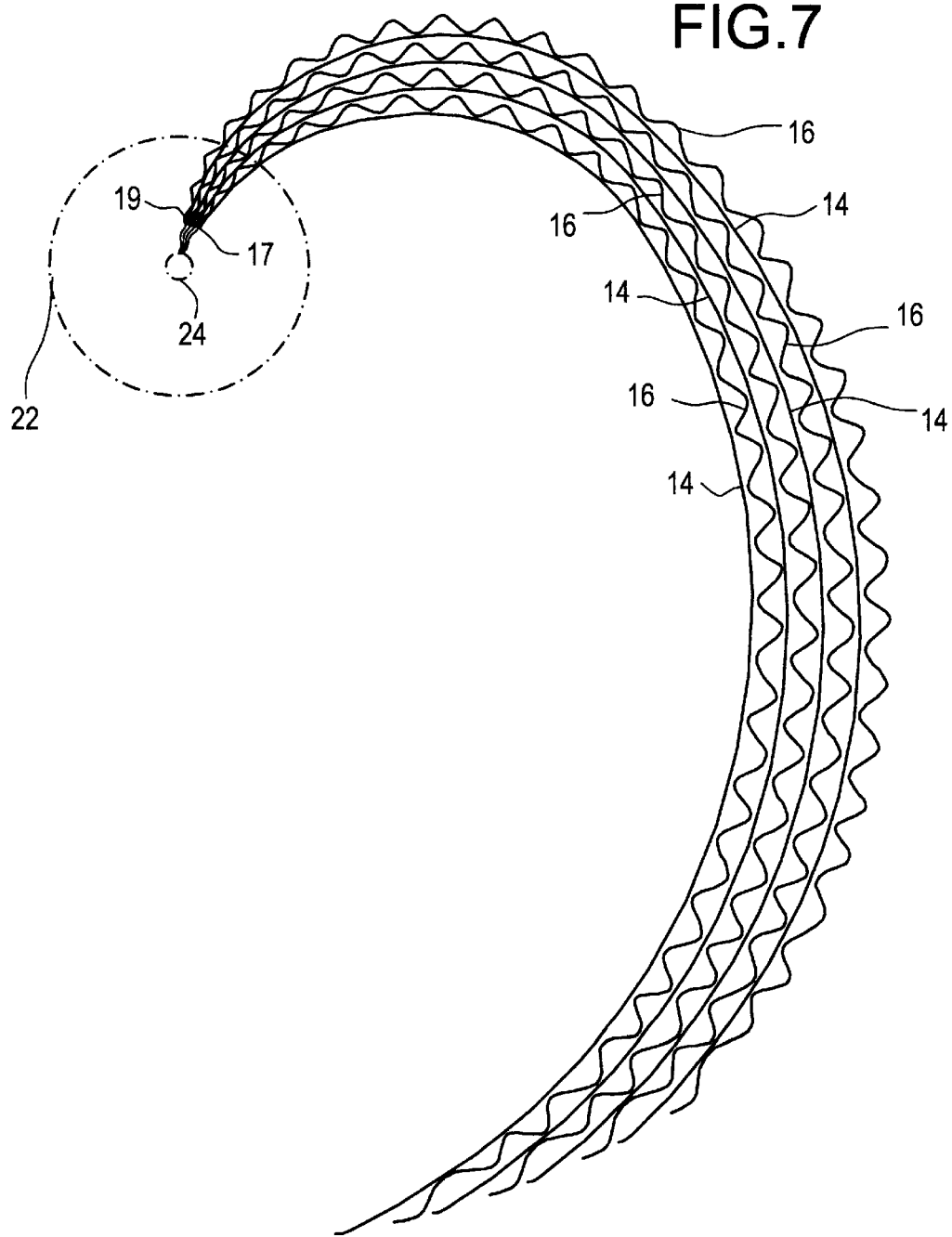

STRUCTURE FOR CONVERTER BODY

This is a continuation of application Ser. No. 08/501,755, filed Jul. 12, 1995, now abandoned.

This invention relates to an improved structure for a metallic converter body. This structure is characterized in that the individual core elements of thin metal foil are attached at one end only to the outer jacket or housing, the other end being free to move. The principal advantage of this structure is that the durability of the device is surprisingly improved.

BACKGROUND OF THE INVENTION

Converter bodies have long been formed of a plurality of thin metal strips or layers wound about a central pin or about spaced "fixation" points. Such prior converter bodies, including prior catalytic converters, have utilized a support means both at the outer end of the individual layers as well as the inner end. The support means, at a minimum, has often been the housing for the converter body in combination with a central pin or post. In certain instances, the interior support means has been, at least in part, as a result of looping the thin metal layers about a fixed point or points whereby the inner ends of the thin metal layers have been supported by another thin metal layer. Most: often, the thin metal strips or layers forming the multicellular honeycomb body have been brazed together intermediate the ends thereof whereby a rigid honeycomb monolith has been formed. In all instances, however, both the inner and the outer ends of the layers have been supported.

The support has been effected by soldering, welding, brazing, riveting, clamping, reverse wrapping or folding, or the like whereby the inner and outer ends, and usually the intermediate portion, of the layers or strips are fixedly secured to the support member. Varying degrees of success in passing tests prescribed by automobile manufacturers have been achieved.

It has now been found that the structure can be improved by allowing one end, e.g., the inner end, of the thin metal core elements to "float" in the fluid stream. Whereas it was previously thought that rigidity was essential to prevent failure in the "Hot Tests" (described below), it has been discovered that flexure or compliance of the thin metal core elements in response to thermal and fluid flow variations as well as mechanical vibration is a desirable attribute of the converter bodies. This discovery has given rise to what we term a "cantilever" converter body, i.e., one in which the thin metal core elements forming the core are secured at one end only, preferably at the outer end, in a spirally wound device. In such a construction, the individual thin metal core elements are "compliant," that is, they yield to stresses within the elastic limit of the thin metal.

This invention will be described in connection with embodiments especially adapted for use in the exhaust lines of various types of engines, e.g., internal combustion engines of the spark ignited or compression ignited types, stationary or mobile, or gas turbines. It will be understood that the converters of the present invention may be used to effect various chemical reactions, particularly those occurring in fluid streams, especially gas streams, and which reactions are catalyzed or uncatalyzed. A particular reaction is the oxidation of pollutant materials contained in exhaust streams from internal combustion engines.

Catalytic converters containing a corrugated thin metal (stainless steel) monolith have been known since the early 1970's. See Kitzner U.S. Pat. Nos. 3,768,982 and 3,770,389 each dated 30 Oct., 1973. More recently, corrugated thin metal monoliths have been disclosed in U.S. Pat. No. 4,711,009 dated 8 Dec., 1987 to Cornelison et al which discloses a process for making precoated corrugated thin metal strips in a continuous manner, and accordion folding them into predetermined shapes;

U.S. Pat. Nos. 4,152,302 dated 1 May, 1979, 4,273,681 dated 16 Jun., 1981, 4,282,186 dated 4 Aug., 1981, 4,381,590 dated 3 May, 1983, 4,400,860 dated 30 Aug., 1983, 4,159,120 dated 28 May, 1985. 4,521,947 dated 11 Jun., 1985, 4,647,435 dated 3 Mar., 1987, 4,665,051 dated 12 May, 1987 all to Nonnenmann alone or with another and which disclose multicellular honeycomb monolithic converters with corrugated and flat thin metal strips having their contiguous surfaces brazed together; U.S. Pat. No. 5,070,694 dated 10 Dec., 1991 to Whittenberger which discloses spirally wound converters with corrugated strips and flat strips. International PCT Publication WO 90/12951 published 9 Apr., 1990 seeks to improve axial strength by form locking layers of insulated plates. Another reference which seeks to improve axial strength is U.S. Pat. No. 5,055,275 dated 8 Oct., 1991 to Kannainian et al. Reference may also be had to International PCT Publication No. 92/13626 filed 29 Jan., 1992, This application relates to a multicellular honeycomb converter body along an axis of which fluid can flow through a plurality of channels. The honeycomb has at least two discs in axially spaced relation to each other. According to the specification, there is at least one bar type support near the axis by which the discs are connected together and mutually supported. The invention is said to make possible design of the first disc for fast heating up through hot exhaust gas passing through, or applied electrical current. The honeycomb body serves as a support for catalyst in the exhaust system of an internal combustion engine. Another reference is German Patent Application 4,102,890 A1 filed 31 Jan., 1991 and published 6 Aug., 1992. This application discloses a spirally wound corrugated and flat strips combination wherein the flat strip contains slots and perforations and is electrically heatable. The flat strips include a bridge between leading and trailing portions. Groups of strips are separated by insulation means. Another reference is U.S. Pat. No. 5,102,743 dated 7 Apr., 1992. This patent discloses a honeycomb catalyst carrier body of round, oval, or elliptical cross-section including a jacket tube and a stack of at least partially structured sheet metal layers intertwined in different directions in the jacket tube. The stack has a given length and a given width. At least one of the sheet metal layers has a greater thickness over at least a part of one of the dimensions than others of the layers. Such at least one layer is formed of thicker metal or of a plurality of identically structured metal sheets in contiguous relation.

European Patent Application 0,322,566 filed 25 Nov., 1988 discloses a spirally wound honeycomb core formed of corrugated and flat thin metal strips. In this structure, the head ends in the center of the strips are grasped in the middle in order to coil the strips, or they can be grasped sequentially one after the other and coiled. The strips are weakened appropriately in the middle at the head ends of the strips by a pair of inwardly directed slots.

Reference may also be had to U.S. Pat. No. 4,832,998 dated 23 May, 1989 to Cyron. This patent discloses an S-wound honeycomb converter body and a method of producing it, the body including a stack of structured metal sheets disposed in layers at least partially spaced apart from each other defining a multiplicity of channels through which gases can flow, the stack having ends looped in mutually opposite directions about at least two spaced fixation points, and a jacket tube surrounding the sheets and being formed of at least one segment, the sheets having the ends of the loops joined with the jacket tube. The devices have no central post. A method is U.S. Pat. No. 4,923,109 dated 9 May, 1990 to Cyron, a division of the aforementioned Cyron patent, directed to the method of making the devices of the earlier US patent.

Reference may also be had to U.S. Pat. No. 5,232,671 dated 3 Aug., 1993 to Brunson. This patent discloses an improved electrically conductive metal honeycomb body having a plurality of corrugated thin metal strips, which may be heater strips, extending in electrical parallel between otherwise electrically isolated connector plates. The corrugated thin metal strips have a flat central section. A first group of strips is gathered at their flat middle portions and bent around one of a pair of rigid central posts, and a second group of strips is gathered and bent in the opposite direction about the other of the posts. Insulation in the form of flexible woven ceramic fiber strips isolate the first and second groups from each other and from the central posts. The connector plates define a segmented retainer shell about the body. A battery is connected to the connector plates whereby current flows from one connector plate through the corrugated thin metal strips to the other connector plate and back to the battery.

As indicated above, a common problem with many of the prior devices has been their inability to survive severe automotive industry tests which are known as the Hot Shake Test and the Hot Cycling Test.

The Hot Shake test involves oscillating (100 to 200 Hertz and 28 to 60 G inertial loading) the device in a vertical attitude at a high temperature (between 800 and 1050 degrees C.; 1472 to 1922 degrees F., respectively) with exhaust gas from a gas burner or a running internal combustion engine simultaneously passing through the device. If the device telescopes, or displays separation or folding over of the leading or upstream edges of the foil leaves, or shows other mechanical deformation or breakage up to a predetermined time, e.g., 5 to 200 hours, the device is said to fail the test.

The Hot Cycling Test is run with exhaust flowing at 800 to 1050 degrees C.; (1472 to 1922 degrees F.) and cycled to 120 to 200 degrees C. once every 10 to 20 minutes for 300 hours. Telescoping or separation of the leading edges of the thin metal foil strips, or mechanical deformation, cracking or breakage is considered a failure.

The Hot Shake Test and the Hot Cycling Test are: hereinafter called "Hot Tests" and have proved very difficult to survive. The structures of the present invention will survive these Hot Tests. Other tests similar in nature and effect are known in the industry.

In the following description, reference will be made to "ferritic" stainless steel. A suitable ferritic stainless steel is described in U.S. Pat. No. 4,414,023 dated 8 Nov., 1983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV." Another stainless steel metal alloy especially useful herein is identified as Haynes 214 alloy which is commercially available. This alloy and other useful nickeliferous alloys are described in U.S. Pat. No. 4,671,931 dated 9 Jun., 1987 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steels are examples of high temperature resistive, oxidation resistant (or corrosion resistant) metal alloys that are useful for use in making the thin metal core elements hereof, as well as the multicellular honeycomb converter bodies hereof. Suitable metal alloys must be able to withstand "high" temperatures, e.g., from 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal, that is, having a thickness of from about 0.001" to about 0.005", and preferably from 0.0015" to about 0.0037". The housings, or jacket tubes, hereof are of stainless steel and have a thickness of from about 0.03" to about 0.04", e.g., 0.04" to 0.06".

Reference will also be made to ceramic fiber insulation. Details of a suitable ceramic fiber insulation will be found in U.S Pat. No. 3,795,524 dated 5 Mar., 1974 to Sowman, and to U.S. Pat. No. 3,918,057 dated 28 Oct., 1975 to Hatch, for formulations and manufacture of fibers useful in making tapes and mats useful herein. One such woven ceramic fiber material is currently available from 3-M under the registered Trademark. "NEXTEL" 312 Woven Tape and is useful for insulation between the inner and outer housings hereof. Ceramic fiber mat is commercially available under the trademark "INTERAM" also available from 3-M. Between the thin metal core elements hereof the only insulation is provided by refractory metal oxide coating on the surfaces of the thin metal strips, or layers.

BRIEF STATEMENT OF THE INVENTION

Briefly stated, the present invention is a converter body comprising a housing, and a core formed of a plurality of thin metal core elements in the form of strips, sheets, or layers, each of said core elements having a distal end and a proximal end, the distal ends being secured to said housing, and at least some, preferably all, of the proximal ends being free. The core bodies hereof may be formed of all corrugated thin metal core elements, preferably nonnesting corrugated thin metal core elements, or alternating corrugated and flat thin metal core elements.

A more specific embodiment of the invention contemplates an electrically heatable converter comprising (a) an inner housing, b) an outer housing, (c) a multicellular core body including an electrically heatable portion formed of flat thin metal heater bands each having a distal end and a proximal end, and corrugated thin metal core elements each having a distal end and a proximal end, and a light-off portion formed of flat thin metal bands, which are not electrically heatable, and each having a distal end and a proximal end, said flat thin metal bands being in alternating relation with corrugated thin metal core elements each having a distal end and a proximal end, said corrugated thin metal core elements extending into said electrically heatable portion and overlapping the upstream portions of the flat heater bands, said core body being contained within said inner housing, (d) insulation means disposed between said inner housing and said outer housing, and (e) means for electrically heating said electrically heatable portion, the distal ends of said thin metal core elements and bands each being secured to the inner housing, as, for example, by welding or brazing, at least some, and preferably all, of the proximal ends of said bands and core elements being free and unsupported.

BRIEF DESCRIPTION OF THE DRAWINGS

The invention will be better understood by having reference to the annexed drawings showing a preferred embodiment of the invention and wherein:

FIG. 3 is a cross-sectional view of a an electrically heatable catalytic converter in accordance herewith showing in diagrammatic form the free inner ends of the core elements.

FIG. 4 is a perspective view of an electrically heatable converter body in accordance herewith.

FIG. 6 is an edgeview of a portion of a corrugated thin metal core element and a pair of contiguous flat thin metal core elements showing a decreasing amplitude of corrugation at the proximal end as the thin metal core element approaches the center of the device.

FIG. 7 is a view like FIG. 2 showing on an enlarged scale the proximal ends of the core elements in another embodiment.

DETAILED DESCRIPTION OF THE INVENTION

Figure 1:
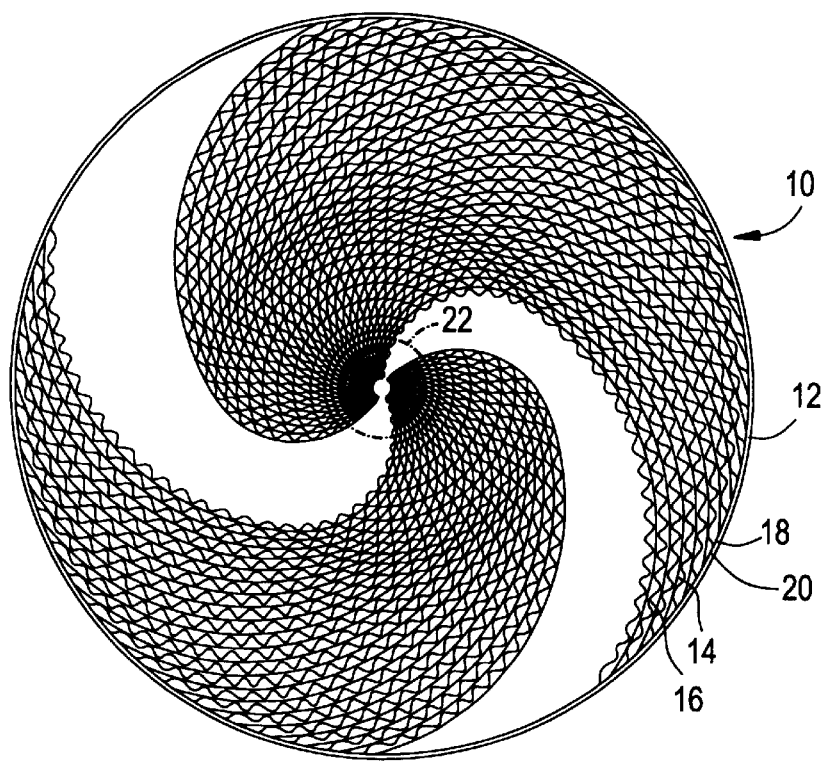
FIG. 1 is an end view of a converter body in accordance herewith showing a multicellular metallic, spiraliform converter body formed of alternating corrugated and flat thin metal core elements in the form of strips, sheets, or layers with the distal, or outer, ends thereof secured to the jacket tube or housing and the proximal, or inner ends thereof free to float.

As indicated above, the present invention is a multicellular converter body formed from a housing and a plurality of core elements of thin metal. The core elements are connected to a rigid body member or housing 12 at one end only, hence the name "cantilever." The multicellular converter bodies hereof are conveniently formed from precoated thin metal strips, such as may be produced by the process of Cornelison et al described in U.S. Pat. No. 4,711,009. The converter bodies hereof may be made solely of corrugated thin metal core elements which are nonnesting, or of alternating corrugated and flat thin metal core elements. In the preferred embodiments, the thin metal strips, which will be used as core elements, are precoated. The distal, or outer ends are masked to maintain them free of any coating so as to facilitate brazing or welding to the housing or to an intermediate sleeve. As indicated in U.S. Pat. No. 4,911,007, supra, the coating is desirably a refractory metal oxide, e.g., alumina, alumina/ceria. titania, titania/alumina, silica, zirconia, etc. and, if desired, a catalyst may be supported on the refractory metal oxide coating. For use in catalytic converters, the catalyst is normally a noble metal, e.g., platinum, palladium, rhodium, ruthenium, indium, or a mixture of two or more of such metals, e.g., platinum/rhodium. The refractory metal oxide coating is generally applied in an amount ranging from about 10 mgs./square inch to about 80 mgs./square inch.

The corrugations generally have an amplitude of from about 0.02 inch to about 0.1 inch, and a pitch of from about 0.02 inch to about 0.25 inch. Where a nonnesting corrugated thin metal core element is used, the corrugations are generally patterned, e.g., a herringbone pattern or a chevron pattern, or skewed pattern. In a "skewed pattern," the corrugations are straight, albeit at an angle of from 3 degrees to about 10 degrees to the parallel marginal edges of the strips. The latter thin metal core elements may be layered without nesting. Where alternating corrugated and flat thin metal core elements are used to form the multicellular bodies hereof, straight-through corrugations may be conveniently used, these exhibiting the lowest pressure drop at high flow in fluid flowing through the converter body. The straight-through corrugations are usually oriented along a line normal to the longitudinal marginal edges of the thin metal strips, although, as indicated above, the corrugations may be oriented along a line oblique to the longitudinal marginal edges of the thin metal strips. It should be pointed out that it has been found advantageous to lightly corrugate the "flat" thin metal core elements to reduce stress. By "lightly corrugate" we mean forming corrugations having an amplitude of from about 0.002" to about 0.01", e.g., 0.005" and a pitch of from about 0.02" to about 0.2", e.g., 0.1". Thin metal core elements so "lightly corrugated," will be referred to herein generically as "flat" thin metal core elements.

Figure 2:
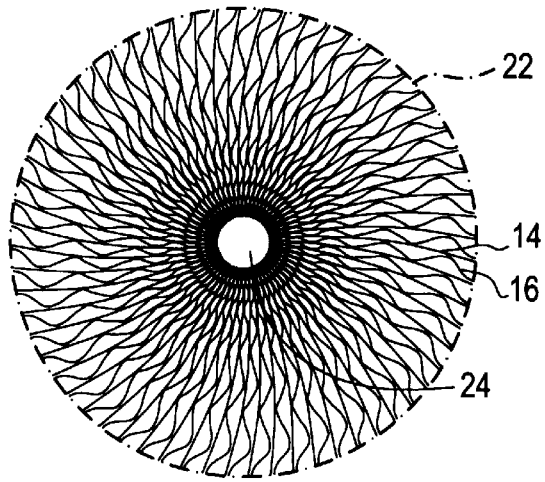
FIG. 2 is an end view on an enlarged scale of the portion in the dotted circle in FIG. 1 and showing the free proximal ends of the corrugated and flat core elements.

Referring now to FIGS. 1 and 2, there is shown an end view of a "cantilever" multicellular converter body 10 formed of alternating corrugated thin metal core elements 16 and flat thin metal core elements 14. The thin metal core elements may be a ferritic stainless steel. The converter body 10 also includes a surrounding housing, or jacket tube 12, which may be formed of a 0.03" to 0.07" thick stainless steel. The distal ends 18 and 20 of the thin metal core elements 14 and 16 are secured to the housing 12 as by brazing or welding. Brazing is preferred. The inner ends, or proximal ends of the thin metal core elements 14 and 16 are unattached. It should be noted that desirably the corrugated core elements 16 decrease in amplitude, although the pitch remains the same, as they approach the center 24 of the core body or converter body 10. Because of the involute shape of the core elements 14 and 16, the farther away from the center 24, the more nearly constant, becomes the amplitude and the pitch of the corrugations. Thus, from a practical point of view, the amplitude of the corrugations as they approach the housing 12 becomes virtually constant and may be specifically constructed in such a manner.

FIG. 2 shows on an enlarged scale, the area represented by the circular dotted line 22 in FIG. 1. The center 24 is a gap showing that the thin metal core elements 14 and 16 do not meet and are free floating in that they are not attached to another member. The center or gap 24 is desirably about 0.01" wide.

FIGS. 3 and 4 show an embodiment of the converter bodies hereof in a combined electrically heatable and light-off converter. These converters are integral in the sense that in the electrically heatable end, the flat thin metal core elements are divided into two bands. The front or upstream heater bands are electrically heatable, and the downstream bands, which are coplanar with the heater bands, are flat and located in the light-off portion of the converter body. The flat downstream bands are preferably not electrically heatable and, on the upstream end, overlap the corrugated thin metal core elements, the latter extending the full axial length of the converter body. The electrically heatable portion initiates the chemical reaction, e.g., oxidation, and the light-off portion completes the conversion to harmless by-products which are discharged to the atmosphere. The device shown in FIGS. 3 and 4 has a special terminal bus and retainer to facilitate providing electrical power to the electrically heatable portion.

While it is convenient and economical to make the thin metal core elements of a single kind of metal, it will be found advantageous to use different alloys, for example, some core elements made of ferritic stainless steel, and others made of a nickel/chromium alloy such as Haynes 214 or Haynes 230. This structure provides additional durability in the Hot Tests described above. The corrugated thin metal core elements hereof are strips conveniently from about 2" to 5" wide and from about 7" to about 13" long with the ends flattened. The flat thin metal core elements hereof are strips conveniently from about 2" to about 5" wide, and from about 7" to about 13" long. The heater bands are conveniently from about 0.4" to about 0.8" wide, e.g., 0.5" wide. The flat thin metal bands are from about 1.2" to about 5.6" wide. The gap between the flat thin metal heater bands and the flat thin metal bands is from about 0.01" to about 0.15".

Referring now to FIGS. 3 and 4, it will be observed that the axial extent of the sector 41 of the terminal bus and retainer 25 spans the division line 78 between the electrically heatable portion 72–74 of the converter body 10 and the light-off portion 76 downstream of the front or inlet face 70. The downstream edge 80 (FIG. 4) of the terminal bus and retainer 25 abuts the upstream edge 82 of the inner housing 52, and may desirably be seam welded thereto. It will be seen, therefore, that there is provided in the sequence of gas passage through the converter body 10, a directly electrically heatable zone 72 having a given thermal inertia, and intermediate indirectly electrically heatable zone 74 having a larger thermal inertia, and a non-electrically heatable light-off zone 76. The three elements of a "cascade" device are present, albeit of the same diameter, in an outer housing 50. This greatly simplifies the structure of a "cascade" installation while preserving the advantages thereof. Between the inner housing 52 and the outer housing 50 there may be provided insulation 54, such as a ceramic fiber mat 54, e.g., "INTERAM" as described above. Also, end cap adaptors 56 and 58 are conveniently provided to enable placement of the structure of FIG. 3 in an automobile exhaust line. There is provided in FIGS. 3 and 4, a terminal bus and retainer 25 having a pair of arcuate members 51 and 53 that lie on the circular periphery of the core body 10. The arcuate members 51 and 53 each have two axially extending sectors of different axial length, the axially shorter sectors 38 and 43 of these being attached to the terminals 45 and 47 respectively and to one end of the heater bands; and the axially longer sectors 41 and 49 of these being attached to the opposite ends of the heater bands (not shown in FIGS. 3 and 4). The axially longer sectors 41 and 49 are dimensioned axially to meet and be joined with the inner tubular housing 52 as by seam welding, for example. Narrow strips 39a and 41a join the two axially extending portions 38 and 41, and the two axially extending portions or sectors 43 and 49, respectively. The narrow strips 39a and 41a are removable after assembly, and are included only for assembly purposes. Also shown in FIGS. 3 and 4 are an outer tubular housing 50 (FIG. 3) and an inner tubular housing 52 (FIGS. 3 and 4).

FIG. 3 also shows a center gap extending the axial length of the core body 10 and the electrically heatable portion 72–74. The gap indicates that the proximal ends of the thin core elements comprising the bodies do not meet but are free in that they remain unattached to another member.

The arcuate members 51 and 53 are joined by a cross-bar 26. Terminals 45 and 47 extend through the outer housing 50 through an insulated feed-through generally indicated at 60 and 62, respectively. For details of a suitable insulated feed through, reference may be had to commonly owned to Sheller, U.S. Pat. No. 5,238,650 dated 24 Aug., 1993. Terminal 45 is stud welded, for example, to the sector 38 of the terminal and bus retainer 25, and is, in turn, connected to one pole 64 of a voltage source generally indicated at 68 in FIG. 4. The opposite terminal 47 is stud welded, for example, to the portion 43 of the terminal bus and retainer 25, and is, in turn, connected to the other pole 66 of a voltage source 68. In an automotive vehicle, the voltage source is normally a 12 volt or 24 volt lead-acid battery. Higher voltages may be used, and may be either AC or DC, single or multiphase up to 120 volts or higher.

Figure 5:
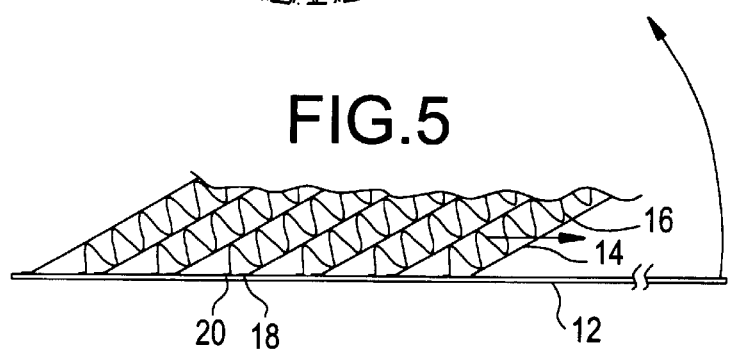
FIG. 5 is a diagram of one mode of making the devices hereof showing the individual core elements secured to a metal strip which will become the jacket tube, or housing, or a liner for said jacket tube, or housing, upon forming into a circle.

FIG. 5 shows a method of making a "cantilever" structure in accordance herewith. There is provided a flat core element 12, which may ultimately become the outer housing 12 (FIG. 1), or layered therewith. As such, the flat strip 12 has a length equal to the inner circumference of the housing 12, e.g. about 8" and a desired thickness, e.g., 0.03". Instead of the relatively difficult to bend 0.03" thick housing 12 material, there may be used a much thinner brazing foil tape strip as the flattened strip 12 which is easier to conform into a circular shape, as for example as a liner for the outer housing 12. While in the flat condition, there are secured to the flattened strip 12 alternating flat thin metal core elements 14 and corrugated thin metal core elements 16 each desirably about 5" in length. The distal ends 18 and 20 of the flat and corrugated core elements 14 and 16, respectively, are bent at an angle to the normal plane of the core elements, e.g., 30 to 45 degrees. The ends 18 and 20 are cleaned, or otherwise rendered free of any coating on the end to enable attachment to the flat strip 12 by brazing or welding. Then, the strip 12 is bent into a circle and the ends of the strip 12 butt welded to become the jacket tube or housing 12 (housing 50 in FIGS. 3 and 4). The proximal ends 17 and 19 (FIG. 2) of the thin metal core elements 14 and 16 are unattached to any other member.

Instead of bending the strip 12 into a circle, the strip 12 with the thin metal strips attached may be inserted into a funnel shaped form and forced to the narrow opening of the desired diameter. The confronting ends of the strip 12 are then seam or butt welded to complete the core body 10. Alternatively, the distal ends 18 and 20 of the thin metal core elements 14 and 16 may be made long enough to underlie the distal end of the next thin metal core element, and the distal ends thus overlapped may be brazed to one another. The resulting quite flexible assembly may be inserted into a jacket tube 12 lined with brazing foil and this assembly inductively heated to fuse the brazing foil and secure the strips to the jacket tube or housing 12. Numerous other methods of making the cantilever type converter bodies hereof may be employed.

FIG. 7 shows the proximal ends of a few core elements in another embodiment of the invention. Here, instead of the core elements 14 and 16 extending substantially the entire distance from the housing into the center of the core body, as for example, shown in FIG. 2, the corrugated core elements 16 extend toward the center a distance greater than the flat core elements 14, and may actually become nested at the proximal ends thereof.

Numerous variations in the preferred structure above described may be used without departing from the invention. For example, although electrical connections at the outside of the core have been shown, such electrical connections may be made in the middle of the core and at the outside periphery. While straight-through cells have been shown, patterned cells, such as those formed with herringbone or chevron shaped, or angled corrugations, may also be used. Where the latter type of corrugations are used, the flat thin metal core elements may be omitted. While thin metal core elements have been shown and described without tabs on the ends of the strips, as shown for example, in U.S. Ser. No. 08/322,258 supra, the structure of the latter application may be used, if desired. While a circular core body has been shown, it will be understood that any cross-sectional configuration, e.g., oval, elliptical, rectangular, or the like may be used. While it is desirable to make the devices hereof from a single stainless steel alloy or nickel/chromium alloy, it will be found desirable to strengthen the core body by using various reinforcing means, such as fashioning some of the thin metal strips or layers from a ferritic stainless steel, for example, and others from a nickel/chromium alloy; or by doubling or tripling the thickness of one or more of the strips or layers.

What is claimed is:

1. A converter body comprising (a) a housing, and (b) a core, said core comprising a plurality of thin metal core elements defining a plurality of cell passages between two adjacent elements, each of said core elements having a distal end and a proximal end, the distal ends being secured to said housing, and the proximal ends being free from attachment within the body.

2. A converter body as defined in claim 1 wherein a portion of the thin metal core elements are flat and in alternating relation with another portion of the thin metal core elements which are corrugated.

3. A converter body as defined in claim 1 wherein all of the thin metal core elements are corrugated in a nonnesting pattern.

4. A converter body as defined in claim 1 wherein the thin metal core elements are precoated with a refractory metal oxide coating.

5. A converter body as defined in claim 4 wherein the refractory metal oxide coating comprises alumina.

6. A converter body as defined in claim 4 wherein the refractory metal oxide coating has a noble metal catalyst supported thereon.

7. A converter body as defined in claim 6 wherein the noble metal catalyst is selected from the group consisting of platinum, palladium, rhodium, ruthenium, indium and mixtures of said metal catalysts.

8. A converter body as defined in claim 2 wherein the corrugations of each of the corrugated thin metal core elements have a decreasing amplitude toward the proximal end.

* * * * *